United States Patent [19]

Parish

[11] Patent Number: 4,672,799
[45] Date of Patent: Jun. 16, 1987

[54] RIDING MOWER SIDE GUARD

[76] Inventor: Bruce A. Parish, 609 E. Prosser #4, Cheyenne, Wyo. 82007

[21] Appl. No.: 744,952

[22] Filed: Jun. 17, 1985

[51] Int. Cl.⁴ .................... A01D 35/14; A01D 53/08
[52] U.S. Cl. ..................... 56/17.4; 56/10.4; 56/320.1
[58] Field of Search ............ 56/10.4, 17.4, 17.5, 56/16.7, 320.1, 320.2; 293/20; 172/508; 193/804, 835

[56] References Cited

U.S. PATENT DOCUMENTS

| | | | |
|---|---|---|---|
| 522,147 | 6/1894 | Chambers | 293/20 |
| 631,933 | 8/1899 | Forwood | 293/20 |
| 1,764,791 | 6/1930 | Ingle | 198/835 |
| 2,960,811 | 11/1960 | Roesel | 56/10.4 |
| 3,721,074 | 3/1973 | Heth | 56/10.4 |
| 4,079,960 | 3/1978 | Carson | 56/10.4 |

Primary Examiner—Robert Peshock
Assistant Examiner—John G. Weiss
Attorney, Agent, or Firm—Dean P. Edmundson

[57] ABSTRACT

An improvement is described for riding lawn mowers. The improvement comprises movable guard means which is disposed along one side of the housing for the cutting means. The guard means is adapted to move relative to the housing when the guard contacts a stationary object (e.g., a tree, retaining wall, bushes, etc.) when the mower is moving. The movable guard means protects the stationary object from damage as the mower moves past it.

7 Claims, 9 Drawing Figures

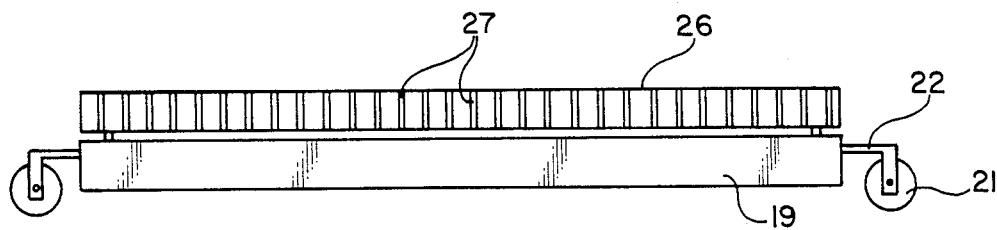
FIG. 2
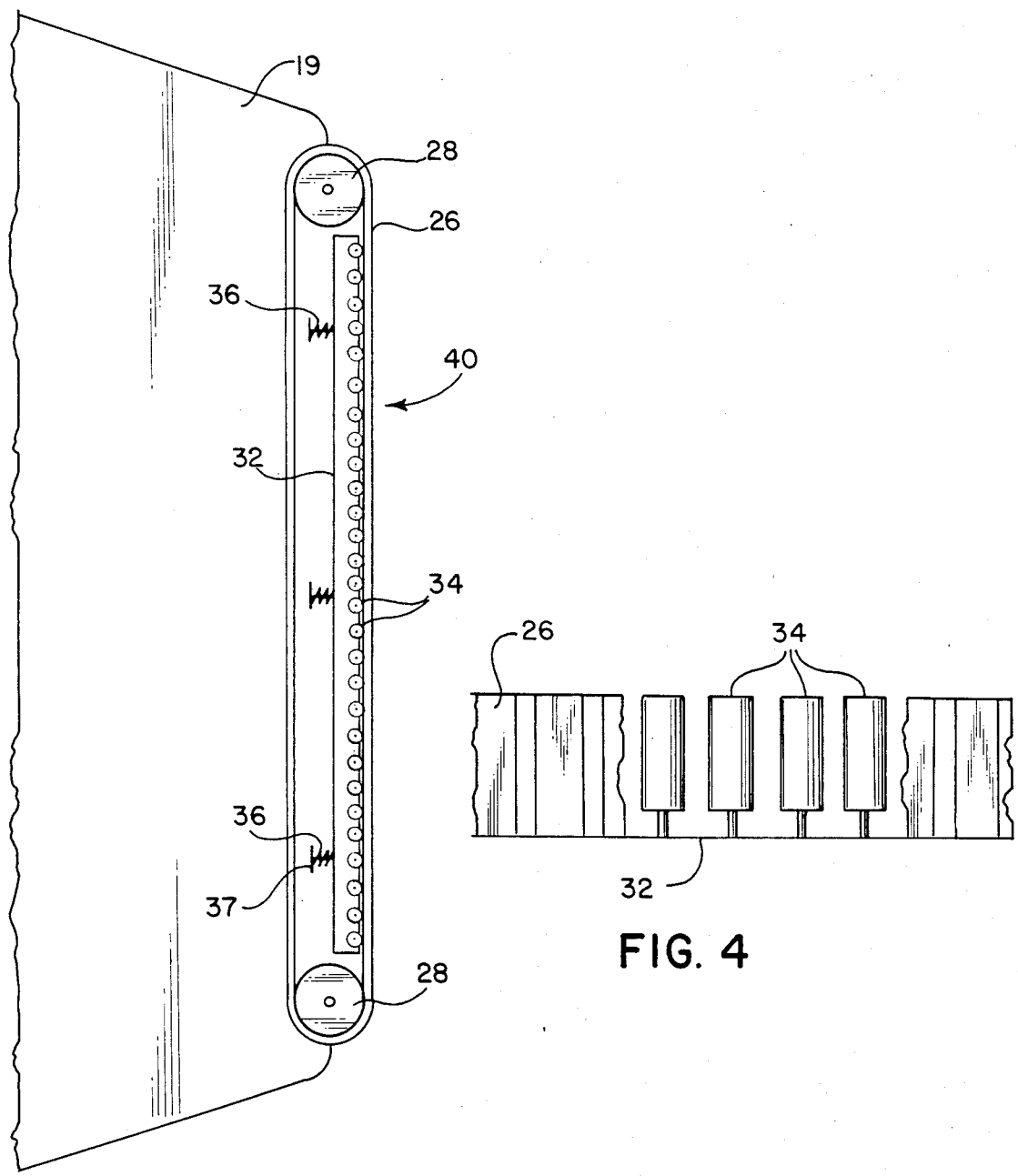
FIG. 3
FIG. 4

FIG. 5
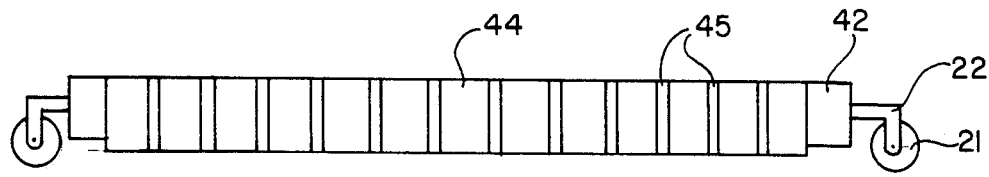
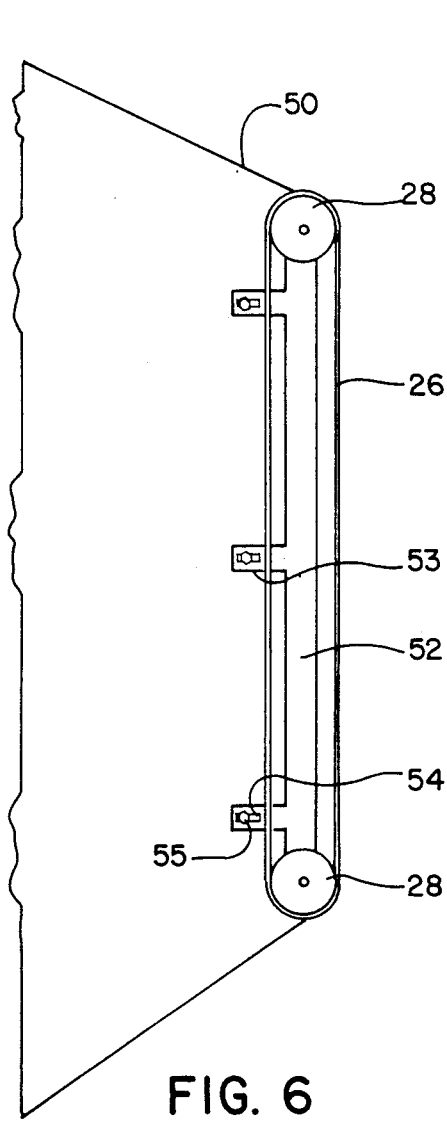
FIG. 6
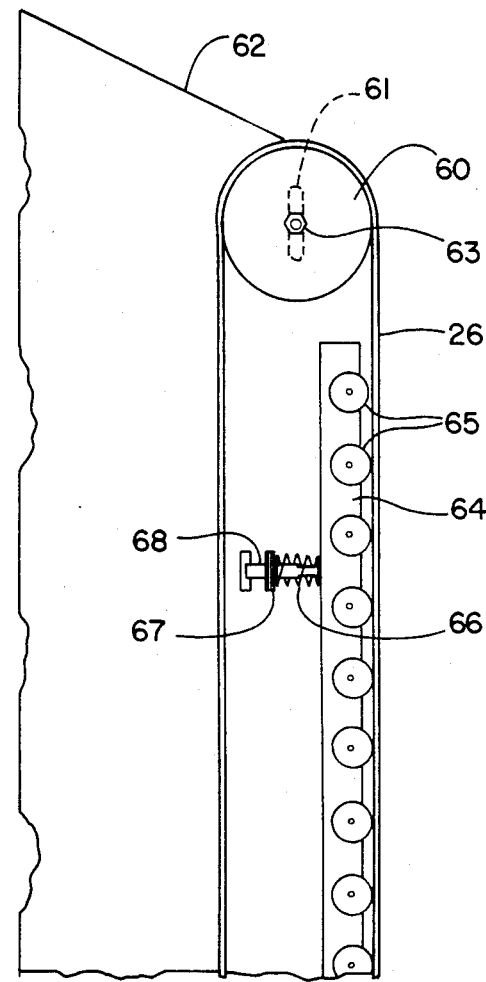
FIG. 7

RIDING MOWER SIDE GUARD

FIELD OF THE INVENTION

This invention relates to riding lawn mowers. More particularly, this invention relates to guard members for use with riding lawn mowers.

BACKGROUND OF THE INVENTION

For mowing large areas of grass (e.g., public parks, schools, golf courses, cemeteries, and other very large lawns) it is necessary as a practical matter to use a large riding lawn mower which is capable of cutting a wide swath. There are various types of such lawn mowers which are commercially available and are commonly used. Some of such lawn mowers utilize cutting reels while other types utilize large blades which rotate in a horizontal plane. Both general types of lawn mowers include a housing for the cutting means, whether the cutting means comprises cutting reels or rotating blades. The purpose of the housing is to support the cutting means and also to shield the cutting means. The housing and cutting means are sometimes referred to as a cutting deck.

As these large riding lawn mowers are used to cut grass there is a tendency by the operator to attempt to mow as close as physically possible to stationary objects such as trees, retaining walls, bushes, benches, playground equipment, water fountains, etc. so that it is not necessary to go back with a walk-behind mower to trim around the stationary objects. Unfortunately, if an operator drives the mower too close to stationary objects (either intentionally or inadvertently) the side of the cutting deck may actually contact the stationary object. As a result, there may be permanent damage caused to the stationary object.

For example, if the edge of the cutting deck strikes or slides along the surface of a young tree it will normally strip a portion of the bark off or otherwise do significant damage to the tree. Indeed, such an injured tree may even die as a result. When the moving cutting deck strikes similar objects such as hedges and bushes, similar damage may result. Also, when the moving cutting deck comes into contact with a stationary object such as a retaining wall (e.g., a concrete wall) or similar object, permanent damage can be caused to both the side of the cutting deck and the stationary object.

Because of the large size of many of the commercially available riding lawn mowers, and also because of the difficulty of maneuvering such machines close to stationary objects, it is difficult even for experienced and careful operators to operate such machines close to stationary objects without an appreciable risk of contact therewith. For example, the riding lawnmowers typically have a large cutting deck which extends forwardly of the machine. As the machine moves over the ground the cutting deck may move unexpectedly one direction or another if a wheel of the machine passes over a bump or falls into a hole or depression in the ground. Thus, even if a high degree of care is exercised by the machine operator there is still some risk of contact. Of course, for less experienced or less careful operators, there is considerably more risk of contact and attendant damage.

SUMMARY OF THE INVENTION

In accordance with the present invention there is provided an improved riding lawn mower of the type having cutting means carried within a housing. The improved lawn mower includes movable guard means on one side of the housing opposite the discharge side of the deck. The guard means is adapted to move relative to the housing when the guard means contacts a stationary object while the mower is moving.

Preferably the moving guard means extends along substantially the entire length of one side of the cutting deck of the riding mower. When the operator positions the mower too close to a stationary object the movable guard means contacts the stationary object and is adapted to be motionless relative thereto while moving relative to the cutting deck of the lawn mower. As a result there is no scraping of the stationary object by the side or edge of the cutting deck. Damage to the stationary object is accordingly avoided.

BRIEF DESCRIPTION OF THE DRAWINGS

The invention is described in more detail hereinafter with reference to the accompanying drawings wherein like reference characters refer to the same parts throughout the several views and in which:

FIG. 2 is a side elevational view of the embodiment of improved cutting deck shown in FIG. 1;

FIG. 3 is a top view of another embodiment of movable guard means useful in the present invention;

FIG. 4 is a partial cut-away side view of the embodiment of movable guard means shown in FIG. 3;

FIG. 5 is a side elevational view of another embodiment of the invention;

FIG. 6 is a top view of another embodiment of this invention;

FIG. 7 is a top view of yet another embodiment of the invention;

DETAILED DESCRIPTION OF THE INVENTION

Figure 1:
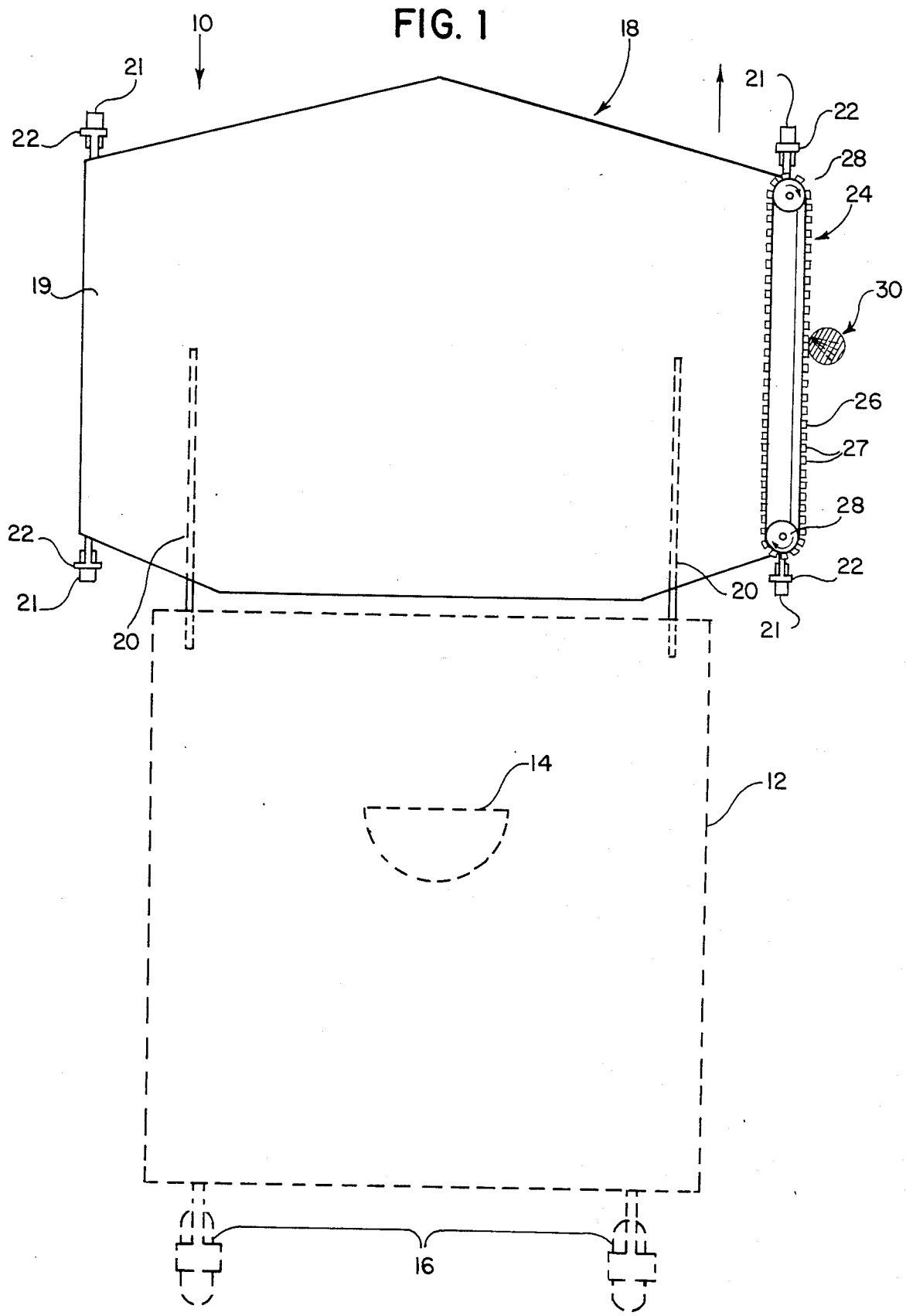
FIG. 1 top view of one embodiment of an improved riding lawn mower in accordance with this invention.

In FIG. 1 there is shown a top view of a riding lawn mower 10 of this invention. The lawn mower includes main power unit 12 normally comprising a gasoline engine to power the mower. The operator sits on seat 14 on top of the unit. The mower includes drive wheels (not shown) and steering wheels 16 controlled by the operator.

Attached to the front side of the power unit is cutting deck 18. Lift arms 20 are carried by the power unit and are adapted to raise and lower the cutting deck in response to controls operated by the operator of the mower.

The cutting deck 18, as shown in FIG. 1, may comprise a housing 19 and cutting reels or blades (not shown) within the housing. Cutting reels normally rotate about a horizontal axis while cutting blades normally rotate about a vertical axis (so that the cutting blades rotate in a horizontal plane). The cutting means (whether it be reels or blades) is powered by the power unit. Wheels 21 may be located at or near each corner of the housing 19 and rotatably carried by brackets 22 supported by housing 19. The wheels 21 are adapted to support the cutting deck 18 on the ground when the deck is in lowered position for cutting.

On one side of the cutting deck there is provided movable guide means assembly 24 which comprises, in one embodiment, an endless belt 26 which is flexible and which is supported by rotatable pulleys 28 carried by housing 19. Preferably belt 26 is made of a durable but flexible rubber or similar material. The outer surface of the belt may be provided with raised ribs or protrusions 27, if desired.

As the lawn mower is operated and moving in the direction of the arrow, if the operator drives close to tree 30 (the trunk of which is shown in cross-section), the outer surface of belt 26 contacts the tree trunk. Rather than scraping or damaging the bark of the tree, the belt 26 is engaged by the tree and remains stationary relative to the tree as lawn mower 10 moves past. This is possible because the belt 26 is able to rotate around pulleys 28 when it engages a stationary object (e.g., a tree, retaining wall, etc.). Because the belt does not move relative to the stationary object, no damage is caused to the stationary object. Also, no damage is caused to the side of the cutting deck either.

When the lawn mower is operated in normal manner not in close proximity to stationary objects the belt 26 does not move at all. It is only when the lawn mower is operated in contact with stationary objects that belt 26 moves around pulleys 28. It is not necessary to apply any rotary power to pulleys 28. Rather, pulleys 28 should be freely rotatable so that when belt 26 engages a stationary object the belt can remain stationary relative to the object as the mower is driven past it. Pulleys 28 may be provided with grease zerks, if desired, or with sealed bearings.

FIG. 2 is a side elevational view of the embodiment of FIG. 1 showing the edge of housing 19 and belt 26. In this embodiment the belt 26 is mounted above the housing. Preferably, the height of belt 26 is in the range of about 3 to 8 inches.

FIGS. 3 and 4 illustrate another embodiment of movable guard means 40 useful in the present invention. In this embodiment the endless belt is supported by two rotatable pulleys 28, as discussed above. Between the two pulleys 28 there is an elongated guide member 32 on which there are mounted a plurality of freely rotatable rollers 34. The elongated guide member 32 is resiliently urged or biased toward the inside surface of belt 26. For example, there may be provided spring members 36 positioned between guide member 32 and stop members 37 carried on top of housing 19. Then when the mower is operated so that belt 26 comes into contact with a stationary object, guide member 32 and rollers 34 serve to limit the extent to which belt 26 may be deflected inwardly.

In FIG. 5 there is shown a side elevational view of a lawn mower deck 42 which includes movable guard means comprising an endless belt 44 which extends along substantially the full length of the side of deck 42 and is in the plane of deck 42. If desired, the exterior surface of belt 44 may include raised ribs or protrusions 45. The belt 44 is supported by rotatable pulleys (not shown) carried by deck 42.

FIG. 6 is a top view of a lawn mower deck 50 which includes another embodiment of movable guard means of the invention comprising endless belt 26 supported by rotatable pulleys 28. In this embodiment the rotatable pulleys 28 are carried on mounting bracket 52 which includes arms 53 with slotted apertures 54 therein. Bolts 55 extend through apertures 54 and fasten to the top of deck 50. Because the apertures 54 are slotted, the bracket 52 may be positioned inwardly or outwardly, as desired, relative to the side of deck 50.

The embodiment of movable guard means illustrated in FIG. 6 may be mounted on an existing lawn mower. Alternatively, the cutting deck may be manufactured with the movable guard means as an integral part of the deck (e.g., as shown in FIG. 5).

FIG. 7 illustrates another embodiment of this invention. Rotatable pulley 60 is mounted to the top of cutting deck 62 by means of bolt 63 extending through the center of pulley 60 and passing also through slotted aperture 61 in deck 62. This manner of attachment enables the pulley 60 to be easily moved forward or backward to tighten or loosen belt 26, as needed. Elongated guide means is provided adjacent the interior surface of belt 26, as shown. The guide means includes plate 64 carrying rotatable rollers 65. Plate 64 is resiliently urged outwardly by means of spring 66 positioned between plate 64 and stop member 67 supported by bracket 68 on deck 62. As belt 26 engages a stationary object when the cutting deck 62 is operated in close proximity to such object, the guide means may be deflected inwardly slightly against spring 66.

Figure 8:
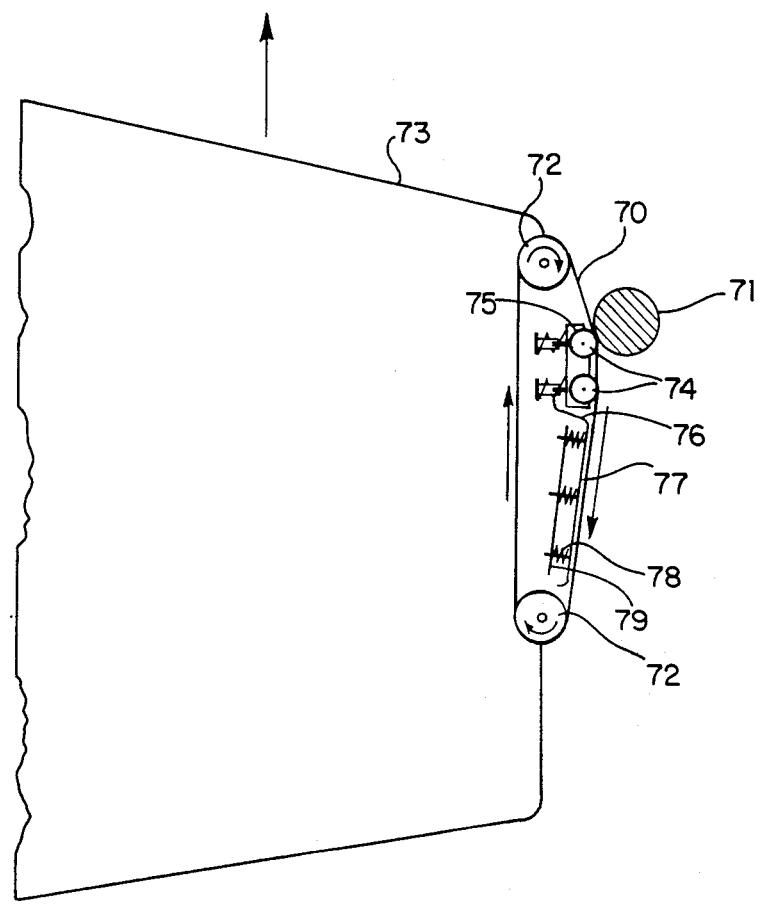
FIG. 8 is a top view of still another embodiment of this invention.

FIG. 8 illustrates yet another embodiment of movable guide means useful in the present invention. In this embodiment endless belt 70 is trained around spaced apart pulleys 72 (carried by cutting deck 73) and idler rollers 74. As cutting deck 73 moves forwardly (in the direction of the arrow) in close proximity to stationary object 71 (e.g., a tree), movable belt 70 contacts the object. Then the belt 70 remains stationary relative to object 71 and rotates around pulleys 72 in the direction of the arrows. This prevents damage to the object 71 and also prevents damage to the side of the cutting deck.

Figure 9:
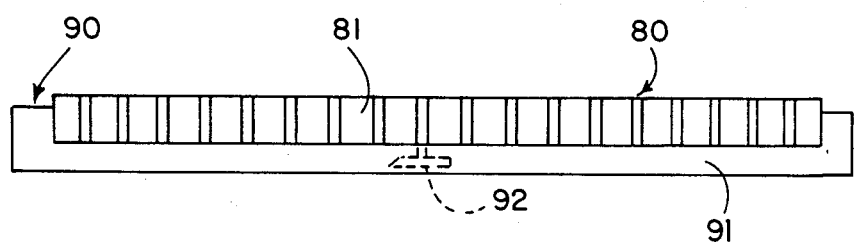
FIG. 9 is a side elevational view of another embodiment of this invention.

FIG. 9 illustrates another embodiment of the invention in which endless belt 80 is mounted on one side edge of cutting deck 90. In this embodiment the belt 80 has a height less than that of the deck 90. Cutting blade 92 is lower than the belt 80 and extends outwardly to near the edge of deck 90. The outside edge 81 of the belt 80 extends outwardly slightly beyond the side edge of cutting deck housing 91 so that the edge of the cutting deck housing is not permitted to contact any stationary object as the mower is being operated.

Idler rollers 74 are carried on plate 75 which is urged outwardly by springs 76. Between rollers 74 and one of pulleys 72 there may be guide plate 77 which is urged outwardly by springs 78 between plate 77 and stop member 79 supported on deck 73.

Other variants are possible without departing from the scope of the present invention. For example, there may be used more than one movable guard on the cutting deck, if desired. Also, movable guards may be positioned on both sides of the cutting deck.

What is claimed is:

1. In a riding mower of the type having cutting means carried within a housing, wherein said cutting means comprises a blade adapted to rotate in a horizontal plane, and wherein said housing extends over the top side and the ends of said blade, wherein the improvement comprises movable guard means disposed on one side of said housing, said guard means being adapted to move relative to said housing when said guard means contacts a stationary object while said riding mower is moving; wherein said movable guard means comprises a flexible endless belt which is adapted to rotate around two rotatable support pulleys carried by said housing;

wherein an elongated guide member is disposed between said support pulleys, wherein a plurality of rotatable rollers are carried by said guide member, wherein said guide member is biased outwardly in a manner such that said rotatable rollers are urged against the back side of said belt, and wherein said belt and said guide member are adapted to be deflected inwardly when said belt contacts a stationary object.

2. A riding mower in accordance with claim 1, wherein said movable guard extends along substantially the full length of said side of said housing.

3. A riding mower in accordance with claim 1, wherein said belt is composed of rubber.

4. A riding mower in accordance with claim 1, wherein said belt extends along substantially the full length of said side of said deck, and wherein said belt has a height in the range of about 3 to 8 inches.

5. A riding mower in accordance with claim 1, wherein said movable guard means is detachably mounted to said cutting deck.

6. A riding mower in accordance with claim 1, wherein the exterior surface of said belt includes raised ribs.

7. A riding mower in accordance with claim 1, wherein guide member is biased outwardly by means of springs.

* * * * *